(12) United States Patent
D'Alto et al.

(10) Patent No.: US 9,366,538 B2
(45) Date of Patent: Jun. 14, 2016

(54) METHOD AND SYSTEM FOR ESTIMATING AIRCRAFT COURSE

(71) Applicant: The Boeing Company, Chicago, IL (US)

(72) Inventors: Luis P. D'Alto, Madrid (ES); Marco La Civita, Madrid (ES)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 14/331,088

(22) Filed: Jul. 14, 2014

(65) Prior Publication Data

US 2015/0066363 A1 Mar. 5, 2015

(30) Foreign Application Priority Data

Aug. 30, 2013 (EP) .................................. 13382341

(51) Int. Cl.
*G01C 21/20* (2006.01)
*G01C 21/00* (2006.01)
*G05D 1/02* (2006.01)
*G05D 1/10* (2006.01)

(52) U.S. Cl.
CPC ............... *G01C 21/00* (2013.01); *G01C 21/20* (2013.01); *G05D 1/0202* (2013.01); *G05D 1/101* (2013.01)

(58) Field of Classification Search
CPC ....... G01C 21/20; G05D 1/0202; G05D 1/101
USPC ................................ 701/408, 445, 521, 578
See application file for complete search history.

(56) References Cited

U.S. PATENT DOCUMENTS

| | | | | |
|---|---|---|---|---|
| 4,939,663 A | * | 7/1990 | Baird | 701/445 |
| 5,003,305 A | * | 3/1991 | Kelly et al. | 340/974 |
| 5,390,125 A | * | 2/1995 | Sennott et al. | 701/472 |
| 5,596,332 A | * | 1/1997 | Coles et al. | 342/455 |
| 5,740,048 A | * | 4/1998 | Abel et al. | 701/470 |
| 6,366,851 B1 | * | 4/2002 | Chojnacki et al. | 701/468 |
| 6,577,952 B2 | * | 6/2003 | Geier et al. | 701/446 |
| 6,865,453 B1 | * | 3/2005 | Burch | G01C 21/00 244/1 R |
| 7,228,227 B2 | * | 6/2007 | Speer | 701/467 |

(Continued)

FOREIGN PATENT DOCUMENTS

| | | | | |
|---|---|---|---|---|
| WO | WO 03036233 A1 | * | 5/2003 | G01C 21/14 |
| WO | WO 2009060776 A1 | * | 5/2009 | G01C 21/16 |
| WO | WO 2011057323 A1 | * | 5/2011 | G08G 9/00 |

OTHER PUBLICATIONS

Wikipepia article, "Least Squares", old revision, Aug. 23, 2013, 12 pages, downloaded from: https://en.wikipedia.org/w/index.php?title=Least_squares&oldid=569818922.*

(Continued)

*Primary Examiner* — Behrang Badii
*Assistant Examiner* — David Testardi
(74) *Attorney, Agent, or Firm* — Patterson + Sheridan, LLP

(57) ABSTRACT

A method of estimating a course of an aircraft includes: receiving a time series of location data indicating a plurality of locations along a route take by an aircraft; defining a trajectory function for representing a path of the aircraft; fitting the trajectory function to at least a portion of the time series; defining a position that identifies the location of the aircraft along the route; projecting the defined position onto the trajectory function; and estimating a course of the aircraft as being a tangent of the trajectory function at the projected defined position.

20 Claims, 3 Drawing Sheets

(56) References Cited

U.S. PATENT DOCUMENTS

| | | | |
|---|---|---|---|
| 7,386,392 B1* | 6/2008 | Kabel | G01C 21/20 340/425.5 |
| 7,460,064 B1* | 12/2008 | Tester et al. | 342/357.51 |
| 7,610,152 B2* | 10/2009 | Meyer | 701/408 |
| 8,396,659 B2* | 3/2013 | Ando et al. | 701/446 |
| 2006/0224318 A1* | 10/2006 | Wilson et al. | 701/213 |
| 2007/0213927 A1* | 9/2007 | Ishigami et al. | 701/207 |
| 2008/0275602 A1* | 11/2008 | Peake | 701/25 |
| 2010/0039318 A1* | 2/2010 | Kmiecik et al. | 342/357.07 |
| 2010/0331010 A1 | 12/2010 | Ische | |
| 2011/0298648 A1* | 12/2011 | Ferro | 342/29 |
| 2012/0150426 A1 | 6/2012 | Conway | |
| 2014/0236482 A1* | 8/2014 | Dorum et al. | 701/533 |
| 2014/0350850 A1* | 11/2014 | Kmiecik et al. | 701/487 |

OTHER PUBLICATIONS

Strain, Robert C et al., "A Lightweight, Low-Cost ADS-B System for UAS Applications", AIAA 2007-2750, AIAA 2007 Conference and Exhibit, May 7-10, 2007, Rohnert Park, California, 9 pages.*

Quora question, "Can we define the tangent of a straight line?", asked Aug. 29, printed Oct. 23, 2015, 2 pages, downloaded from: https://www.quora.com/Can-we-define-the-tangent-of-a-straight-line.*

N. Chernov, published by Chapman & Hall/CRC, in the series Monographs on Statistics and Applied Probability, vol. 117, Circular and Linear Regression, Fitting Circles and Lines by Least Squares, Chapters 2 and 4, pp. 25-46 and 69-98, respectively, copyright 2011.

Extended European Search Report for Application No. 13382341.9 dated Feb. 20, 2014, six pages.

B.L. Stevens and F.L. Lewis, Aircraft Control and Simulation, Hoboken, New Jersey: John Wiley & Sons, Inc. 2003.

Osborne, P., The Mercator Projections, 2008.

* cited by examiner

METHOD AND SYSTEM FOR ESTIMATING AIRCRAFT COURSE

CROSS REFERENCE TO RELATED APPLICATIONS

This application claims the benefit of EP Patent Application No. 13382341.9 entitled Method And System For Estimating Aircraft Course, filed on Aug. 30, 2013 in the Spanish Patent Office, the disclosure of which is incorporated herein by reference in its entirety.

FIELD OF THE DISCLOSURE

The disclosure relates to methods for estimating the course of an aircraft such as a passenger plane, or unmanned aerial vehicle, and systems for implementing such methods.

BACKGROUND OF THE DISCLOSURE

Course estimation is of benefit for air traffic controllers, or for operators of unmanned aerial vehicles.

Conventional course estimation methods simply involve the determination of a tangent to a measured track that an aircraft is known to have followed.

Such an approach is not robust to measurement error, or extrinsic factors such as wind variation. Measurement error can cause inaccuracies in course estimation, since a noisy measurement signal will exacerbate inaccuracies when differentiated as part of the calculation of a tangent. Furthermore, wind variation can cause the actual path followed by the aircraft to oscillate around the intended path, making the actual path less indicative of the eventual trajectory of the aircraft.

There is therefore a need in the art for a more robust method for estimating aircraft course.

SUMMARY OF THE DISCLOSURE

According to the disclosure there is provided a method and a system for estimating aircraft course.

The method includes receiving a time series of location data indicating a plurality of locations along a route taken by the aircraft. A trajectory function for representing a path of an aircraft is defined and the trajectory function is fitted to at least a portion of the time series. The method further includes defining a position that identifies a location of the aircraft along the route, projecting the defined position onto the trajectory function, and estimating the course as the tangent of the trajectory function at the projected position.

Optionally, the method may further include defining one or more further trajectory functions, each for representing a path of an aircraft, and fitting the one or more further trajectory functions to at least a further portion of the time series.

Defining a trajectory function to represent the path of the aircraft may comprise defining a trajectory function having parameters which when determined, unambiguously define a path of an aircraft between two locations on an Earth model. Alternatively, or in addition, defining a trajectory function may include defining a plurality of path functions, each of which define a differently shaped path. For example, the plurality of path functions may include a path function that represents a straight track and a path function that represents an arc-shaped track. A path function is selected from the plurality of path functions to fit the at least a portion of the time series, and the selected path function is used as the trajectory function.

The selection of the path function from the plurality of path functions may include defining an error criterion representing an error in how well the path function fits the at least a portion of the time series. The error criterion is calculated for each of the plurality of path functions, and the path function that best fits the at least a portion of the trajectory data is selected. Alternatively, or in addition, the selection of the path function from the plurality of path functions may include calculating from the at least a portion of the time series, tangent against time data representing a plurality of tangents at locations along the route. Each tangent is associated with a time at which the aircraft was at the respective location. A straight line is fitted to the tangent against time data, and the path function is selected based on the gradient of the straight line.

In one aspect, fitting a trajectory function to at least a portion of a time series includes defining an error criterion representing an error in how well the trajectory function fits the at least a portion of the time series. The parameters of the trajectory function are determined which minimize the error criterion.

In another aspect, estimating the current course from the trajectory function using the projected position includes calculating a tangent to the trajectory function at the projected position, and estimating the current course as the calculated tangent.

In an additional aspect, projecting the defined position onto the trajectory function includes calculating a point on the path represented by the trajectory function closest to the current position of the aircraft.

In another aspect, a system is provided for estimating aircraft course. The system includes a processor arranged to carry out any of the methods described above, and a display arranged to display the estimated course.

The scope of the present disclosure is defined solely by the appended claims and is not affected by the statements within this summary.

BRIEF DESCRIPTION OF THE DRAWINGS

The disclosure can be better understood with reference to the following drawings and description. The components in the figures are not necessarily to scale, emphasis instead being placed upon illustrating the principles of the disclosure.

DETAILED DESCRIPTION

Figure 1:
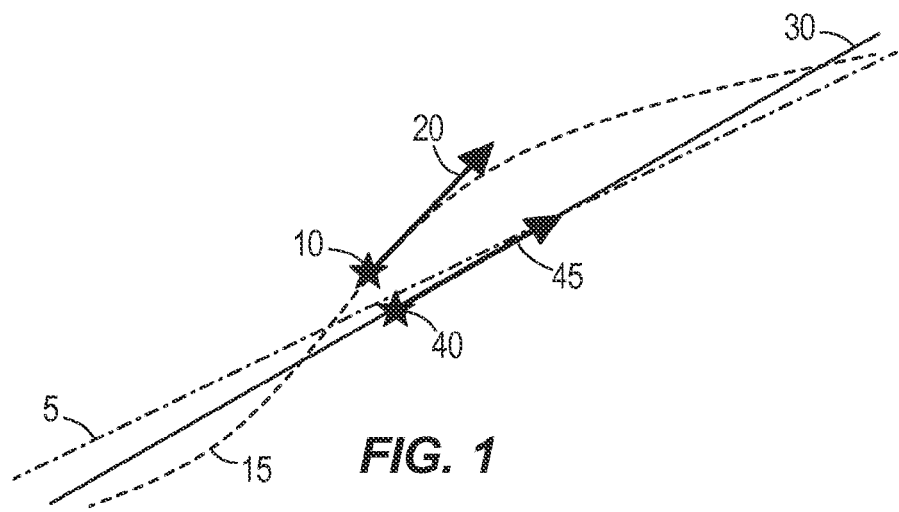
FIG. 1 shows a schematic comparison of one embodiment of the disclosure relative to the prior art approach.

FIG. 1 shows a representation of a measured track 15 followed by an aircraft. The aircraft had intended to follow intended track 5. However, extrinsic factors such as prevailing winds prevented the aircraft from following its intended track 5 without error.

At location 10, a conventional method of course estimation would have estimated the aircraft course at location 10 as the tangent to path 15 and would result in conventional course estimate 20. However, this would not have taken into consideration the intended track 5 of the aircraft.

In embodiments of the disclosure, a function 30 is fit to the data representing measured track 15 in order to estimate the intended track 5. The predicted course of the aircraft is estimated as a tangent of the function 30 (rather than of the measured track 15 as would be conventional). In this way, at location 10, the course is estimated by projecting location 10 onto function 30 to calculate projected location 40. The tangent of function 30 at location 40 is calculated and used as the estimated course 45.

As can be seen from FIG. 1, estimated course 45 provides a better indication of the general course of the aircraft than the conventional estimate 20.

Function 30 in FIG. 1 may be a straight line. Using known mathematical methods, a plurality of functions 30 may be fitted to the measured track 15. That is, each of the plurality of functions 30 may be fitted to sequential, non-overlapping portions of the measured track 15 to thereby collectively define a piece-wise representation of the measured track 15. In this way, the course of the aircraft may be estimated at any location 10 by projecting the location 10 onto the closest of the plurality of functions 30 to calculate projected location 40. The tangent of the closest function 30 at location 40 is calculated and used as the estimated course 45.

While function 30 may represent a straight track and all tracks can be approximated by a plurality of straight lines, the function 30 does not necessarily need to be straight. Moreover, embodiments are envisaged in which a set of functions 30 defining a line or one or more curves can be used. An appropriate function 30 can be selected for each portion of the measured track 15.

Aircraft typically travel between locations following standard track shapes. For example, an aircraft may follow a geodesic, such as a great circle defining the shortest distance between two locations on the Earth, or an aircraft may follow a loxodrome by following a constant track angle. Furthermore, during manoeuvers an aircraft may fly in an arc between great circles or loxodromes. By using a selected Earth model such as WGS84, it is possible to mathematically define a set of functions that each represent one of a plurality of possible track shapes created by an aircraft flying along a straight path or flying standard manoeuvers between such paths.

The functions preferably represent the track shapes in two-dimensions (e.g. in terms of latitude and longitude co-ordinates).

Figure 2:
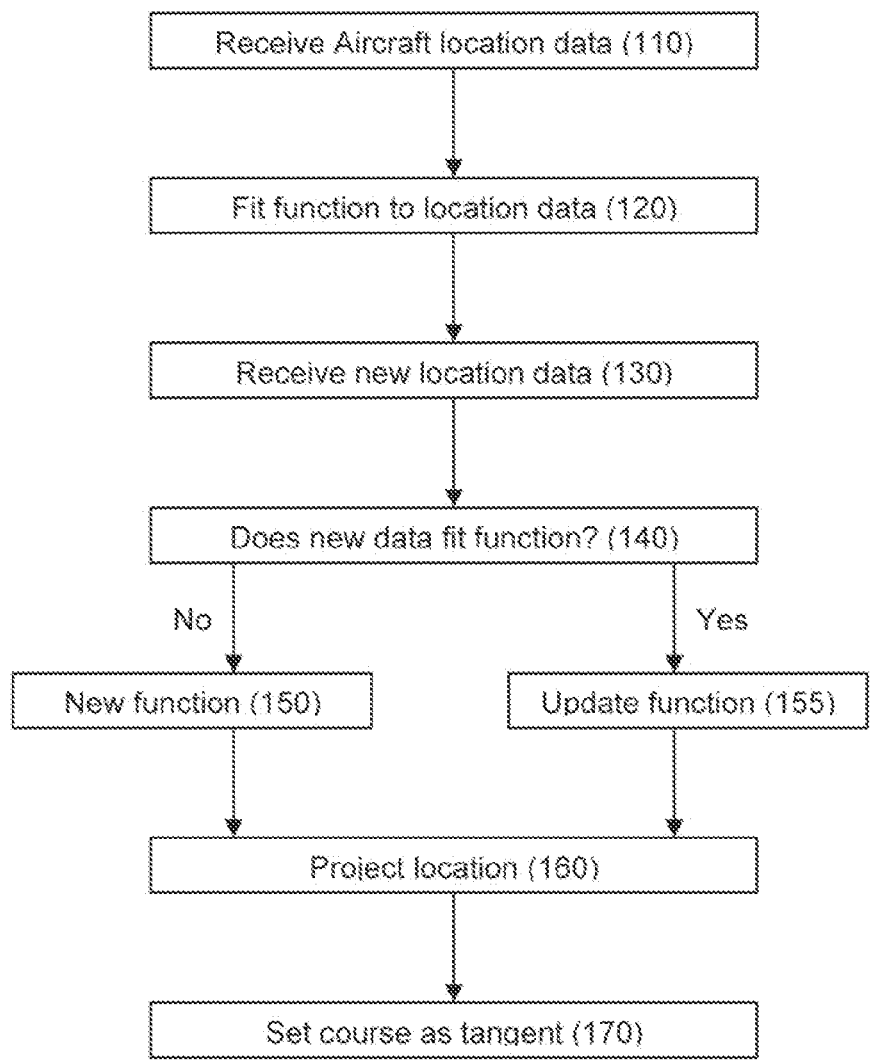
FIG. 2 shows a flow chart of one embodiment of a method in accordance with the disclosure.

FIG. 2 shows a flow chart of a first embodiment of a method of estimating aircraft course. The method involves dividing the track followed by the aircraft into segments and fitting an appropriate trajectory function to each of these.

In step 110, location data indicating one or more locations of the aircraft is received.

In step 120, a trajectory function is fit to the location data to define a current trajectory function. The trajectory function defines a simple form of track that may be followed by an aircraft. For example, the trajectory function may define one of: a straight line; an arc; a loxodrome; or other path shape.

In step 130, new location data is received.

In step 140, the new location data is compared with the current trajectory function to establish whether it fits the current trajectory function. An error criterion (such as the root mean squared error of the distance between the current trajectory function and the new location) indicative of how well the new location data fits the current trajectory function may be compared with a threshold to establish whether the new location is a continuation of the current trajectory function, or indicates that the aircraft has carried out a manoeuver and changed its path.

If the new location data does not fit the current trajectory function, then the method proceeds to step 150.

If the new location data fits the current trajectory function, then the method proceeds to step 155.

In step 150, a new trajectory function is calculated and set as the current trajectory.

In step 155, the current trajectory function is updated using the new data.

In this way, the track is divided into segments, such that the location data for each segment of the track can be considered to be associated with an appropriate trajectory function.

In step 160, the new location data is projected onto the current trajectory function. This can be done by simply identifying the closest point on the track defined by the trajectory function.

In step 170, the tangent to the track defined by the trajectory function at the identified closest point is determined. The determined tangent is used as the aircraft course estimate.

When a new trajectory function is calculated and set as the current trajectory (step 150), there may initially be a period in which further data is required to accurately establish the new trajectory function. This will only be a short period. However, in optional embodiments, during this period the conventional method of establishing course may be used, i.e. by using the tangent at the end of the path of the aircraft. Once a threshold amount of data is available, the new trajectory function may be fitted and the course estimate based on this.

As explained above, in step 120, a trajectory function is fit to the location data to define a current trajectory function. This can be achieved in many ways that would be readily apparent to the Skilled Person.

An example of a method for fitting trajectory functions to location data is described as follows:

As location data is received, the instantaneous course of the aircraft may be estimated as the direction of the track at the associated location. This can be done by any conventional method. For example, the instantaneous course for each location data point may be calculated by plotting a straight line through that location data point and the previous location data point.

Figure 3:
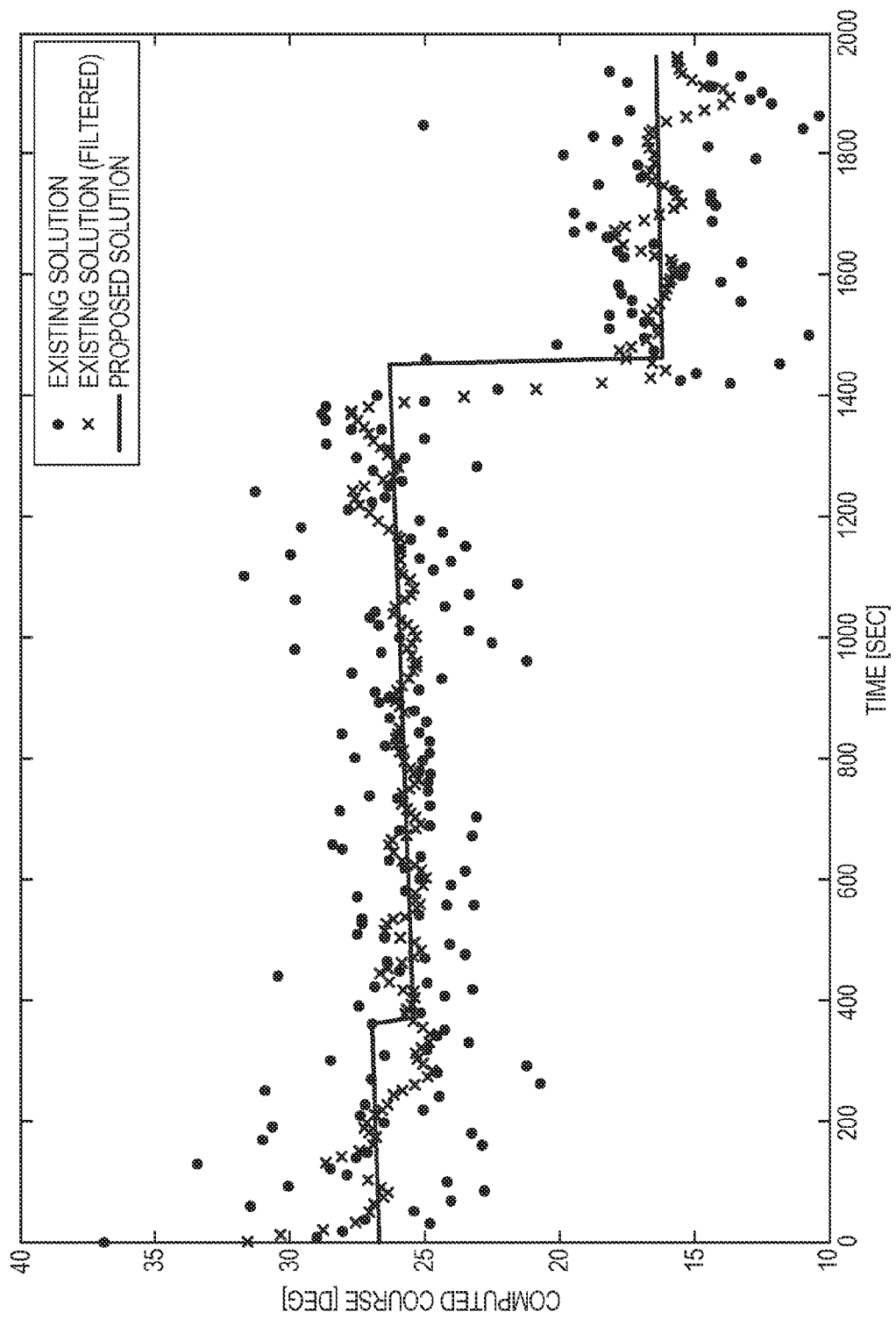
FIG. 3 shows a representative example of the results of the disclosure in comparison with the prior art approach.

The calculated instantaneous course of the aircraft represents the prior art approach to course estimation. FIG. 3 shows an example of the calculated instantaneous course of the aircraft plotted against time. It can be seen that even when filtering is used to remove the unwanted measurement noise, the computed instantaneous course values oscillate significantly.

In the preferred method for fitting trajectory functions to location data, a plurality of straight lines may be fitted to either the instantaneous course against time data or the filtered course against time data.

For example, the straight lines can be fit to the data by minimizing an error criterion such as the root mean square error of the fit.

This may be done by fitting the straight line to the data sequentially (e.g. starting from the earliest location) and iteratively recalculating the straight line as each new data point is added. For each new data point to be added, the total value of the error criterion is re-evaluated. If the addition of the new data point would cause the error criterion to exceed a threshold then the new data point is considered to represent the start of a new line segment. The new line segment will encompass the subsequent data points until a further data point would cause the error criterion to exceed the threshold.

Such a method allows a plurality of straight lines to be fitted to either the instantaneous course against time data or the filtered course against time data.

Each of the calculated plurality of straight lines may represent a trajectory function.

The straight lines may be classified as trajectory functions by comparing the magnitude of the gradient of each straight line (the magnitude of the rate of change of instantaneous course against time) with a set of gradient magnitude thresholds.

For example, a gradient magnitude of zero, or a gradient below a first gradient magnitude threshold represents a loxodrome.

A gradient magnitude equal to or greater than the first gradient magnitude threshold and below a second gradient magnitude threshold represents a geodesic.

A gradient magnitude equal to or greater than the second gradient magnitude threshold represents an arc.

Accordingly, trajectory functions (for example, a loxodrome function, a geodesic function, an arc) may be identified for segment of the location data. Since the approach uses the data sequentially, it can be applied in real-time. Thus, as a new data point is retrieved, either the current trajectory function can be updated by minimizing the error criterion or a new trajectory function can be initialized.

The methods set out above involve fitting lines and curves to data. Such mathematical methods are well known to the skilled person. An example of one of the many texts available to the skilled person is "Circular and linear regression: Fitting circles and lines by least squares", by N. Chernov, published by Chapman & Hall/CRC in June 2010, in the series Monographs on Statistics and Applied Probability, Volume 117 (256 pp.), which is hereby incorporated by reference.

The inventors have developed optional, but more robust methods of fitting particular trajectory functions 30 to location data for that segment of the track. These methods may utilise an Earth model (e.g., WGS84)

In various embodiments, one of the available trajectory functions 30 will correspond with a loxodrome. No special method of fitting the data is required for a loxodrome, for which the estimated course will be constant along its length.

In various embodiments, one of the available trajectory functions 30 will correspond with a circular arc. In this case, a plane tangent to the Earth model (at the first location of the segment, or at one of the locations of that segment) can be defined. The location data for a segment of the track that has been classified as an arc shape can be projected into the plane. A circular arc is fit to the projected location data in the plane. The parameters of the arc (e.g. the radius or center, and the end points of the circular arc) are calculated in the plane, and then projected back onto the Earth Model. The function is then calculated using the projected parameters.

This method is advantageous for arcs, since they are typically small enough that a projection into the plane tangent to the Earth model will only slightly diverge from an arc in the Earth model. However, since a geodesic may extend over a larger distance, using a single plane tangent to the Earth model would lead to a less accurate result.

In various embodiments, one of the available trajectory functions 30 will correspond with a geodesic. In this case, a plane tangent to the Earth model (at the first location of the segment, or at one of the locations of that segment) can be defined. The location data for the segment of the track that has been classified as a geodesic can be sub-divided into a plurality of geodesic segments having a length shorter than a threshold length. Each geodesic segment can be projected into its own local plane. The local plane may be selected as a plane tangent to the Earth model at some point along that segment. For example, the local plane may be selected as a plane tangent to the Earth model at the start, end, or mid-point of that segment. A line can be fit in each local plane to the projected location data for that geodesic segment. The end points of each of these lines are calculated in the respective local plane, and then projected back onto the Earth Model. The function is then calculated using the projected end points.

Although the embodiment set out above has been described as a real-time system for identifying an aircraft's current course, it will be apparent to those of ordinary skill in the art that the method and system can be used for analysis of a stored path.

The course prediction provided by embodiments of the disclosure can be used in many applications.

For example, an embodiment of a system in accordance with the disclosure may be a display system for air traffic control or for an operator of a UAV (unmanned aerial vehicle).

The display system may comprise a display arranged to display the estimated course and a processor arranged to carry out the method described above. The display system may comprise a device for determining a location of aircraft being monitored.

A device for determining a location of aircraft being monitored may comprise a communication device for receiving position data representative of aircraft position. Such data may be calculated by a GPS (global positioning system) device and/or an INS (inertial navigation system) device on the aircraft, and transmitted to the communication device from the aircraft.

Alternatively, or in addition, the device for determining a location of aircraft being monitored may comprise a radar positioning system external to the aircraft.

The position data from the aircraft (such as GPS and/or INS) may be combined with position data from external systems (such as radar) to provide improved accuracy.

Figure 4:
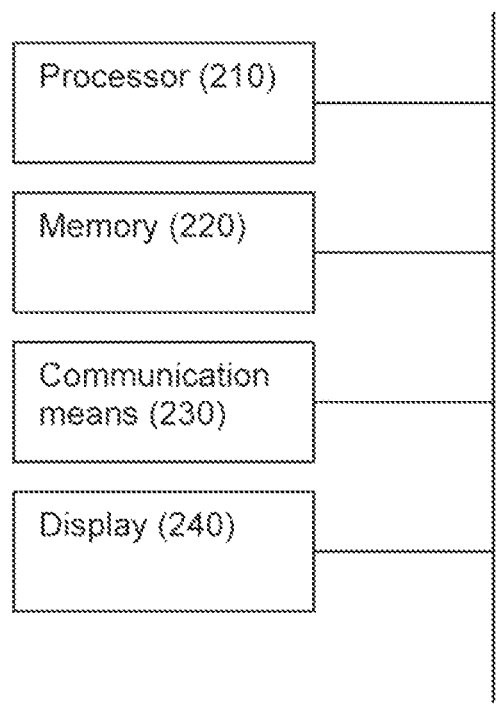
FIG. 4 shows a schematic representation of one embodiment of a system in accordance with the disclosure.

Referring to FIG. 4, an embodiment of the disclosure may comprise a display system for displaying an estimated course of an aircraft. The display system may comprise: a processor (210) arranged to carry out the method of any of the above embodiments; a communication device (230) for receiving location data indicative of the path taken by the aircraft; a memory (220) for storing location data (220); and a display (240) arranged to display the estimated course.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true scope of the subject matter described herein. Furthermore, it is to be understood that the disclosure is defined by the appended claims. Accordingly, the disclosure is not to be restricted except in light of the appended claims and their equivalents.

The invention claimed is:

1. A computer-implemented method of estimating a course of an aircraft comprising:
receiving a time series of location data from at least one of a global positioning system device or an inertial navigation system device on an aircraft indicating a plurality of locations along a route taken by the aircraft and calculating a time series of course estimate data from the time series of location data;
defining a trajectory function from the time series of course estimate data for representing a track of the aircraft;
fitting the trajectory function to at least a portion of the time series of location data;
defining a position that identifies the location of the aircraft along the route;
projecting the defined position onto the trajectory function;
estimating a course of the aircraft as being a tangent of the trajectory function at the projected defined position; and
outputting for display the course of the aircraft estimated as being the tangent of the trajectory function at the projected defined position.

2. The computer-implemented method of claim 1, further comprising:
defining one or more further trajectory functions, each for representing the path of the aircraft; and
fitting the one or more further trajectory functions to at least a further portion of the time series.

3. The computer-implemented method of claim 1 wherein the defining the trajectory function representing the path of the aircraft comprises defining the trajectory function having parameters which, when determined, define the path of the aircraft between two locations on an Earth model.

4. The computer-implemented method of claim 1, wherein fitting the trajectory function to at least the portion of the time series comprises:
defining an error criterion representing an error in how well the trajectory function fits the at least the portion of the time series; and
determining parameters of the trajectory function which minimize the error criterion.

5. The computer-implemented method of claim 1, wherein defining the trajectory function comprises:
defining a plurality of path functions, each of which define a differently shaped path;
selecting from the plurality of path functions a selected path function to fit to the at least the portion of the time series of course estimate data; and
using the selected path function as the trajectory function.

6. The computer-implemented method of claim 5, wherein selecting from the plurality of path functions the selected path function to fit to the at least the portion of the time series comprises:
defining an error criterion representing an error in how well the path function fits the at least the portion of the time series;
calculating the error criterion for each of the plurality of path functions; and
selecting the path function that best fits a portion of trajectory data.

7. The computer-implemented method of claim 5, wherein selecting from the plurality of path functions the selected path function to fit to the at least the portion of the time series of course estimate data comprises:
fitting at least one straight line to the time series of course estimate data; and
selecting the path function based on a gradient of the at least one straight line.

8. The computer-implemented method of claim 5 wherein the plurality of path functions comprise:
one path function that represents a straight track; and
another path function that represents an arc-shaped track.

9. The computer-implemented method of claim 1, wherein estimating the course of the aircraft as being the trajectory function at the projected defined position comprises:
calculating the tangent to the trajectory function at the projected defined position; and
estimating a current course of the aircraft as being the calculated tangent.

10. The computer-implemented method of claim 1 wherein projecting the defined position onto the trajectory function comprises calculating a point on the path represented by the trajectory function closest to a current position of the aircraft.

11. A system for estimating a course of an aircraft, the system comprising a processor, a memory, and a display, wherein said processor is configured to:
receive a time series of location data from at least one of a global positioning system device or an inertial navigation system device on an aircraft indicating a plurality of locations along a route taken by the aircraft and calculate a time series of course estimate data from the time series of location data;
define a trajectory function from the time series of course estimate data for representing a track of the aircraft;
fit the trajectory function to at least a portion of the time series of location data;
define a position that identifies a location of the aircraft along the route;
project the defined position onto the trajectory function;
estimate a course of the aircraft as being a tangent of the trajectory function at the projected defined position; and
display the course of the aircraft estimated as being the tangent of the trajectory function at the projected defined position on the display.

12. The system of claim 11 wherein said processor is further configured to:
define one or more further trajectory functions, each for representing the path of the aircraft; and
fit the one or more further trajectory functions to at least a further portion of the time series.

13. The system of claim 11, wherein fitting the trajectory function to at least the portion of the time series comprises:
defining an error criterion representing an error in how well the trajectory function fits the at least the portion of the time series; and
determining parameters of the trajectory function which minimize the error criterion.

14. The system of claim 11, wherein defining the trajectory function comprises:
defining a plurality of path functions, each of which define a differently shaped path;
selecting from the plurality of path functions a selected path function to fit to the at least the portion of the time series of course estimate data; and
using the selected path function as the trajectory function.

15. The system of claim 14, wherein selecting from the plurality of path functions the selected path function to fit to the at least the portion of the time series comprises:
defining an error criterion representing an error in how well the path function fits the at least the portion of the time series;
calculating the error criterion for each of the plurality of path functions; and
selecting the path function that best fits a portion of trajectory data.

16. The system of claim 14, wherein selecting from the plurality of path functions the selected path function to fit to the at least the portion of the time series of course estimate data comprises:
    fitting at least one straight line to the time series of course estimate data; and
    selecting the path function based on a gradient of the at least one straight line.

17. The system of claim 14, wherein the plurality of path functions comprise:
    one path function that represents a straight track; and
    another path function that represents an arc-shaped track.

18. The system of claim 11, wherein estimating the course from the trajectory function using the projected defined position comprises:
    calculating the tangent to the trajectory function at the projected defined position; and
    estimating a current course of the aircraft as being the calculated tangent.

19. The system of claim 11, wherein projecting the defined position onto the trajectory function comprises calculating a point on the path represented by the trajectory function closest to a current position of the aircraft.

20. The system of claim 11 wherein said processor is further configured to display the estimated course on said display.

\* \* \* \* \*